United States Patent [19]

Watson, Jr.

[11] Patent Number: 4,977,219
[45] Date of Patent: Dec. 11, 1990

[54] LOW TEMPERATURE CROSSLINKING OF WATER-BORNE RESINS

[75] Inventor: Stuart L. Watson, Jr., South Charleston, W. Va.

[73] Assignee: Union Carbide Chemicals and Plastics Company, Inc., Danbury, Conn.

[21] Appl. No.: 904,835

[22] Filed: Sep. 9, 1986

Related U.S. Application Data

[63] Continuation of Ser. No. 816,976, Jan. 7, 1986, abandoned, which is a continuation of Ser. No. 691,378, Jan. 15, 1985, abandoned, which is a continuation of Ser. No. 469,435, Feb. 24, 1983, abandoned.

[51] Int. Cl.$^5$ ............................................. C08F 8/30
[52] U.S. Cl. .............................. 525/329.5; 525/329.6; 525/329.9; 525/374; 528/274; 528/295.5
[58] Field of Search ............... 528/329.5, 329.6, 329.9, 528/374, 274, 295.5

[56] References Cited

U.S. PATENT DOCUMENTS

| 2,937,164 | 5/1960 | Brown et al. ...................... 525/359.1 |
| 3,193,522 | 7/1965 | Neumann et al. .................. 260/45.9 |
| 3,193,523 | 7/1965 | Neumann et al. .................. 260/45.9 |
| 3,193,524 | 7/1965 | Neumann et al. .................. 260/45.9 |
| 3,296,190 | 1/1967 | Reischl et al. ...................... 260/45.9 |
| 3,639,353 | 2/1972 | Brown et al. .................. 260/77.5 R |
| 3,929,733 | 12/1975 | Alberind et al. ............... 260/77.5 R |
| 4,042,558 | 8/1977 | von Bonin et al. ............... 260/37 N |
| 4,096,125 | 6/1978 | Smith et al. ........................... 260/75 |
| 4,148,844 | 4/1979 | von Bonin et al. ................. 260/874 |
| 4,373,078 | 2/1983 | Ritz et al. ............................. 528/374 |

FOREIGN PATENT DOCUMENTS 0851936 10/1960 United Kingdom .
1056202 1/1967 United Kingdom .

Primary Examiner—Bernard Lipman
Attorney, Agent, or Firm—Jean B. Mauro

[57] ABSTRACT

Carboxylated latex resins and neutralized carboxylated water-soluble polymers are crosslinked with aliphatic or cycloaliphatic polyfunctional polycarbodiimides or mixed aliphatic-aromatic polyfunctional polycarbodiimides.

36 Claims, No Drawings

LOW TEMPERATURE CROSSLINKING OF WATER-BORNE RESINS

This application is a continuation of prior U.S. application Ser. No. 816,976, filed on Jan. 7, 1986, now abandoned, which is a continuaton of application Ser. No. 691,378, filed on Jan. 15, 1985, now abandoned, which is a continuation of application Ser. No. 469,435, filed on Feb. 24, 1983, now abandoned.

BACKGROUND OF THE INVENTION

This invention pertains to the crosslinking of water-borne resins and more particularly to a low temperature process which utilizes polycarbodiimides.

Almost every man-made item has a surface coating which serves a decorative and often additionally a protective role. One type of grouping of surface coatings is a division into systems which must be baked at high temperatures for proper curing and those which cure at ambient temperature or with low-temperature baking. These different coating types are utilized on different substrates. For example, the high-bake coatings are employed on items such as automobile fenders which are cured at high temperature. The low-bake coatings would be employed typically for wooden window frames in a home. Traditionally, all of these coating systems were solvent-based; that is, the coating components were dissolved or suspended in an organic material.

Several factors in recent years have contributed to a shift from solvent-based coatings to water-based coatings. These factors include the easier clean-up of water-borne systems, the increasing cost of solvents, and the increasing awareness of the potential harm by organic solvents to the environment. This shift has created intense efforts aimed at reformulating coatings from solvent-based to water-based systems.

For high-bake systems which are cured or crosslinked utilizing melamine or methlyolamide chemistry, the reformulation is rather straight-forward. However, in the conversion of the low-bake solvent systems to water-based formulations, many difficulties have been encountered. A description of the chemistries of the curing reactions of the low-bake solvent systems is needed for understanding of the difficulties in formulating a crosslinkable water-based low-bake coating system.

There are three representative classes of chemistries available for the curing of low-bake solvent-based systems. For systems termed moisture-cure urethanes, polymeric or oligomeric materials are prepared containing residual isocyanate functionality. A coating is prepared from these materials and applied to the particular substrate chosen. Humidity from the air diffuses into the coating, reacting with the isocyanate to release carbon dioxide resulting in the free amine which reacts rapidly with the remaining isocyanate providing the crosslinking mechanism. Conversion of this type of system to a water-based system would be difficult due to high reactivity of the isocyanate with water. A second type of curing system for low-bake solvent systems is the alkene system. In this system a polymeric or oligomeric material is formed by ionic reactions in such a manner and with such materials so as to yield residual double bond functionality. Upon formulation with a catalyst and upon exposure to atmospheric oxygen, the residual double bonds cured by free radical reactions. Most water-based polymers are prepared by free radical reactions in which the polymer preparation stage would tend to cause premature reaction to the alkene double bonds. Some systems have been designed to attempt to utilize the alkene curing reaction for crosslinking, but these systems are difficult to drive to high levels of functionality and thus high levels of crosslinking without attendant problems with reaction rate control and degree of reaction are not achieved. The third representative class of chemistries available for curing low-bake solvent-based coatings involves silicone reactions. Typically, polymeric or oligomeric materials are prepared containing alkoxysilane or acyloxysilane functionality. Upon application of the solvent solution of such materials to the substrate and exposure to the atmosphere, silanes rapidly react with atmospheric moisture to cause hydrolysis to the silanols. These silanols condense to silyloxy crosslinks. This type of system has been attempted in water-based coatings, but the presence of water along with the water-reactive silanes usually causes premature reaction.

From this description the difficulties of developing a water-based low-bake crosslinking system are apparent. Nevertheless, the need for such a system has remained strong. Water-borne low-bake noncrosslinkable coatings are currently employed, for example in interior wall paints. However, such systems are deficient in key qualities and exhibit undersirable properties, such as, high tack, low solvent resistance, and low abrasion resistance.

It is therefore an object of this invention to provide a facile system for crosslinking water-borne resins at low, that is, ambient temperatures.

It is another object of this invention to provide a low-temperature system which affords crosslinked water-borne resins suitable for coating various substrates.

It is a further object of this invention to provide low-temperature crosslinked water-borne resin coatings which exhibit low tack, high solvent resistance and high abrasion resistance.

Other objects will become apparent to those skilled in the art upon a reading of the specification.

SUMMARY OF THE INVENTION

A method has been found for crosslinking water-borne, carboxyl-containing latex resins and neutralized water-soluble organic resins which comprises:

(a) blending said resins at ambient temperatures with about 0.5 to about 30 parts per 100 parts of said resins of an emulsified or water-soluble polyfunctional polycarbodiimide derived from the reaction of mono-di-and tri-cycloaliphatic or saturated aliphatic isocyanates wherein the cycloaliphatic moieties contain from 5 to about 7 carbons and can be substituted with alkyl having 1 to about 6 carbons and oxygen, and the saturated aliphatic moieties contain from 1 to about 18 carbons, wherein the mono- and triisocyanates are optional and (b) applying the blend to a substrate while allowing volatile formulated components to volatilize.

Pressure, temperature and time are not critical, although the reaction will increase in rate at higher temperatures, as expected.

No special equipment is required for the blending operation, which can be carried out batchwise or continuously.

Three steps are employed in the practice of this invention: synthesis, emulsification, and formulation.

In the first step of the synthesis, the polycarbodiimides are prepared by reaction of mono-, di- and tri-isocyanates with the easiest structures to conceptualize being based on mono- and diisocyanates in the molar ratio of about 2:1 to about 2:10 to yield the carbodiimide with evolution of carbon dioxide by the following general equation:

This process usually requires a catalyst, and a preferred catalyst is 3-methyl-1-phenyl-2-phospholene-1-oxide having the formula:

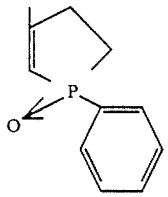

It is not necessary to use a triisocyanate. A combination of mono and diisocyanates in a molar ratio of about 2:2 to about 2:4 is preferred.

The reaction is preferably accomplished in non-reactive solvents, such as, aromatic hydrocarbons having 6 to about 12 carbons, aliphatic esters or glycol diesters, amyl acetate, butyl acetate, propyl propionate, ethyl butyrate, xylene, toluene, diethyl benzene, benzene, diethylene glycolether diacetate, dipropylene glycol ether dibutyrate and hexylene glycol diacetate having about 8 to 20 carbons. The reaction mixture is stirred vigorously, and a small amount of nitrogen is sparged in to assist in driving the reaction to completion by removal of carbon dioxide. Generally mixtures of isocyanates are employed with the relative molar proportions of mono-, di- and tri-isocyanates adjusted to yield the desired product. Isocyanates which may be employed include butyl isocyanate, isophorone diisocyanate, hexamethylene dioscyanate, trimethylhexamethylene diisocyanate, bisisocyanatocyclohexyl methane, and trishexamethylene diisocyanate biuret. In a typical preparation, two moles of butyl isocyanate are reacted with three moles of isophorene diisocyanate to yield an oligomeric polycarbodiimide having approximately four moles of carbodiimide functionality barring any side reactions. These reactants are charged to approximately 50% by weight of reactants in amyl acetate along with about 0.3% by weight of the catalyst. The mixture would be continuously sparged with a small amount of nitrogen and stirred vigorously while heated to approximately 140° C. and held until complete conversion of the isocyanate to the carbodiimide is observed in the infrared spectrum.

Many variations on this synthesis regime will be apparent to one skilled in the art.

While the saturated aliphatic isocyanates previously listed include the more widely available commercial materials, many others can be used as exemplified by:
1,4-tetramethylene diisocyanate
1,12-dodecane diisocyanate
cyclobutane-1.3-diisocyanate
cyclohexane-1.3-diisocyanate
cyclohexane-1.4-diisocyanate
hexahydrotolylene-2,4-and -2,6-diisocyanate While the solvents previously listed are currently preferred, many other solvents would be suitable. Requirements for suitable solvents include having a sufficiently high boiling point to allow efficient accomplishment of the desired reaction and that the solvent not contain active hydrogen functionality such as would react with the isocyanate starting material or the carbodiimide product. Exemplary solvents include: ethylbutylketone, acetophenone, propiophenone, diisobutylketone, cyclohexanone, decalin, methyl CELLOSOLVE acetate, CELLOSOLVE acetate, butyl CELLOSOLVE acetate, CARBITOL acetate, butyl CARBITOL acetate, glycoldiacetate.

Many variations of the catalyst are employable. Examples include the nonoxidized phospholene compound as well as the phospholene sulfide. Additional alternatives include substitutions on and for the phenyl group attached to the phosphorous atom such as by the ethyl moiety. Additional substitutions on the cyclic phosphorous ring can be made, as for example: hydrogen, alkenyl, aryl, aralkyl, alkoxy, chlorine, and bromine.

The process need not be operated at 140° C. for acceptable product has been produced at 130° C. to 160° C. Operation below 120° C. may yield unacceptably long cycle times while operation at 160° C. or above may yield undesired quantities of by-product.

The second step of the invention involves the conversion of the polycarbodiimide solution into a form which is usable in water-based systems. In this step, the polycarbodiimide solution, a surfactant, and water are mixed to yield an emulsion. In a typical preparation, about 20 g of a polycarbodiimide solution being at about 50% activity in an organic solvent such as amyl acetate is mixed with about 50 g of a 2% solution of AEROSOL A-196 (American Cyanamide Trademark for a series of sodium dialkyl sulfosuccinates) and with about 30 g additional of water. The resultant non-homogeneous mixture is mixed vigorously in a high-shear environment such as a Waring blender, a VirTis Ultrashear mixer, or a Silversen mixer. The resultant material thus appears as a low viscosity opaque liquid with the polycarbodiimide well dispersed in the continuous phase. One additional component, a volatile amine, is sometimes employed to insure that the system pH is maintained adequately high. Exemplary volatile amines include dimethylamine, trimethylamine, monoethylamine, diethylamine and the like.

The making of the emulsion of the polycarbodiimide solution may be varied widely. For example, the levels of the reactant carbodiimide and the stabilizer may be widely varied as may the type of surfactant employed. The nature of the surfactant (and possibly cosolvent) system will have a strong influence on the degree, type and time of system mixing required. Finally, the use of amine provides added protection against hydrolysis of the carbodiimide. The type and level of this amine may differ widely.

Finally, with respect to the emulsification step, by modification of the synthesis procedure the polycarbodiimide may be prepared in such a manner that it is water soluble, obviating the need for the emulsion. This procedure may be accomplished by replacement of some or all of the butyl isocyanate with dimethylaminopropylamine followed by reaction with methyl p-toluene sulfonate or dimethyl sulfate. The resultant quarternary salt provides water solubility for use in water-based coatings.

The third aspect of the invention involves the formulation of the polycarbodiimide salt or emulsion. The key requirement of the formulation is that the latex or emulsion polymer or semi-solubilized colloidal polymer or solution polymer in water contain the carboxylic acid functionality. Many systems have the carboxylic acid functionality from copolymerization of acrylic acid, methacrylic acid, or itaconic acid. Alternatively, maleic, fumaric or crotonic acid may be employed. The level of acid in the polymer can be extremely variable, from 1% to 40% by weight. However, the 5% region is estimated to be highly useful.

While the basic ingredients of the crosslinked coating are the carboxylated polymer and the crosslinker polycarbodiimide, many additional ingredients may be present to serve useful roles for special applications. For example, pigments, fillers, and colorants may be used to provide hiding power and decorative effects. Water-soluble polymers may be employed for control of coating rheology, while dispersants and foaming or defoaming agents may additionally be required. As the examples to be presented subsequently show, a wide latitude is present in practical application, and the normally skilled practitioner could envisage numerous additional uses for the concepts of the invention.

The unexpected findings of the present invention may be appreciated by comparison to the current systems. Previously, water-borne low-bake systems based on silicone, isocyanate, and alkene functionality were described. In comparing the polycarbodiimide/carboxylic acid system to these previous systems, the present invention gives greater shelf-life or pot-life as compared to the isocyanate system. In comparison to the silicone system, the system of the present invention provides more formulation latitude as well as eliminating the usual problems inherent in the use of silicon systems. Third, upon comparison to the alkene systems, the ease of reproducibility of the preparation of carboxylated polymers compared to the preparation of polymers containing residual alkene by free radical means allows the polycarbodiimide/carboxylated polymer system to be more reproducible.

In the search for systems which would crosslink water-based low-bake systems, others have developed a system which crosslinks under the desired conditions. That system is based on the aziridine ring and is composed of the use of multifunctional aziridines to crosslink carboxylated polymers. For comparison of the present invention with the aziridine system, it was found that the present system has a longer shelf-life in the formulated form. While properties of the aziridine system began to fall off with time, requiring replenishment of the aziridine component, the polycarbodiimide did not show the diminishment with time, thus indicating a longer shelf-life.

The following examples provide the data in support of this invention disclosure. All parts and percentages are by weight unless otherwise specified. The following groupings of the data may be of interest:

Example 1 shows the preparation of an aliphatic polycarbodiimide while Example 2 shows the preparation of an aromatic polycarbodiimide. Example 3 shows the superiority of the aliphatic polycarbodiimide in a reactivity evaluation.

Examples 4, 5, and 7 show that aliphatic polycarbodiimides can be prepared at different levels of functionality.

Examples 5 and 6 show the different solvents that may be employed.

Examples 8-12 show the general utility of aliphatic polycarbodiimides.

Examples 13 shows that a water-soluble aliphatic polycarbodiimide may be synthesized.

Examples 14-17 show that a wide variety of structures may be prepared using this general procedure.

Glossary of Materials Used

LPCA 5011-20% Cellosolve acetate solution of a carboxylated resin described in U.S. Pat. No. 4,096,125 incorporated herein by reference.

NIAX Polyol PCP-0300—Trademark of Union Carbide Corporation for polycaprolactone triol.

NIAX Polyol PCP-0301—Trademark of Union Carbide Corporation for polycaprolactone triol.

Butyl Carbitol acetate—Trademark of Union Carbide Corporation for the butyl monoether of diethylene glycol monoacetate.

Ucar Latex 153—Trademark of Union Carbide Corporation for carboxylated emulsion polymer.

Ucar Latex 4580—Trademark of Union Carbide Corporation for carboxylated emulsion polymer.

Ucar Latex 175—Trademark of Union Carbide Corporation for carboxylated emulsion polymer.

Colloid 677—Trademark of Colloid Inc. for defoamer.

Mineralite 3X—Trademark of Mineral Co. for Mica.

TiPure R901—Trademark of Dupont for titanium dioxide.

TiPure R960—Trademark of DuPont for titanium dioxide.

ASP-400—Trademark of Minerals and Chemicals for clay.

Chlorowax 40—Trademark of Diamond Shamrock for chlorinated wax.

PMA-30—Trademark of Troy Chemical Corp. for mildewcide.

Celite 281—Trademark of Johns-Manville for diatomaceous silica.

Aerosol A-196—Trademark of American Cyanamid for for the sodium salt of dialkyl sulfosuccinate.

Daniels Disperse-Ayd W-22—Trademark of Daniels Products Co. for dispersant.

Igepal Ca-630 surfactant—Trademark of GAF Corp. for ethoxylated alkyl phenol.

Foamaster V.F.—Trademark of NOPCO Chemical for defoamer.

Nopocide N-96 antimicrobial—Trademark of Diamond Shamrock for tetrachloroisophthalonitrile.

Snowflake—Trademark of Allied Chemical for calcium carbonate.

Surfynol 104 surfactant—Trademark of Air Products for an acetylenic glycol.

Chrome Chem 895—Trademark of Tenneco for pre-dispersed carbon black.

Cellosolve solvent—Trademark of Union Carbide Corporation for a monalkyl ether of ethylene glycol.

Hexyl Cellosolve—Trademark of Union Carbide Corporation for the monohexyl ether of ethylene glycol.

Polyox WSRN (4% active)—Trademark of Union Carbide for mixed alkylene oxide water soluble polyethers.

CYMEL 303—Trademark of American Cyanamid for hexamethoxymethylmelamine.

Tergitol NP—10 Surfactant—Trademark of Union Carbide Corporation for alkylated ethoxylated phenols.

Tamol 731—Trademark of Rohm and Haas for synthetic dispersant.

Butyl Carbitol—Trademark of Union Carbide Corporation for the butyl monoether of diethylene glycol.

XAMA-7 is a polyfunctional aziridene crosslinker available from Cordova Co.

Tests and Terms

The following tests and terms were used in demonstrating the efficacy of this invention.

Double Rub Test—Essentially a piece of cheesecloth is saturated with methyl ethyl ketone, then rubbed on the substrate until penetration. One back and forth rub is a double rub.

Reactivity Test—A test run to determine speed of crosslinking as described in Example 3.

Theoretical functionality—An idealized number based on the theoretical structure assuming pure materials with no side reactions.

Tensile Strength—ASTM D 638-60T.

% Elongation—Sample measured with a ruler to yield % length increase upon immersion in water.

% Weight Gain—Sample weighed on a balance before and after immersion in water.

Formulation Stability—Visual inspection.

Peel Strength—(Cf Example 12).

Sheer Failure—(Cf Example 12) The 180° force is peel while the vertical time is shear.

EXAMPLE 1

Polycarbodiimide Synthesis

Into a 1000 ml round-bottom flask equipped with heating mantle, mechanical stirrer, thermometer, and nitrogen sparge were charged 68.7 g butyl isocyanate, 231.2 g isophorone diisocyanate, 270 g amyl acetate, and 30 g of a 10% solution by weight of 3-methyl-1-phenyl-2-phospholene-1-oxide. The mixture was heated, with stirring at 140° C. for 25.5 hours, then cooled and packaged (533.4 g). The infrared spectrum of the material showed elimination of the isocyanate peak (2260 $cm^{-1}$) with formation of the carbodiimide peak (2130 $cm^{-1}$).

The material was evaluated to have a color rating of 3 (Gardner Hellige Comparator) and a viscosity of less than 0.5 stoke (Gardner Bubble Viscometer). Titration of an aliquot by the procedure of Zaremko and Watts [*Microchem. J. Symp. Ser.*, 2, 591 (1962)] yielded a percent carbodiimide functionality of 9.78% (theory 10.2%). The theoretical functionality of the material was 4.

EXAMPLE 2

Polycarbodiimide Synthesis

Into the apparatus of Example 1 were placed 93.9 g phenyl isocyanate, 206.1 g toluene diisocyanate, 270 g amyl acetate, and 30 g of a 10% solution by weight of 3-methyl-1-phenyl-2-phospholene-1-oxide in xylene. The mixture was heated to 140° C. for 30 minutes at which point infrared analysis showed full conversion of the isocyanate to the carbodiimide. The product was cooled and packaged and found to have a color rating of 7 (Gardner Hellige Comparator) and a viscosity of less than 0.5 stoke. Titration gave a value of 11.36% active carbodiimide functionality (theory 11.9%). The theoretical functionality of the material was 4.

EXAMPLE 3

Reactivity Testing

A material termed LPCA 5011 [U.S. Pat. No. 4,096,125] (20% CELLOSOLVE Acetate, 50% phthalic anhydride, 15% NIAX Polyol PCP-0300, 15% NIAX Polyol PCP-0301 blended to an approximate acid equivalent weight of 363) was used to prepare the following master batch:

| LPCA 5011 | 363 g | (one acid equivalent) |
|---|---|---|
| Triethylamine | 101 g | (one base equivalent) |
| CELLOSOLVE Acetate | 536 g | |
| | 1000 g | |

This master batch was blended with the polycarbodiimide of Example 1:

| Master Batch | 36.0 | (0.036 acid equivalents) |
|---|---|---|
| Polycarbodiimide | 14.0 | (0.036 carbodiimide equivalents) |

This well-stirred mix was placed in an oven at 50° C. and found to gel in 2.3 hours.

This master batch was also blended with the polycarbodiimide of Example 2:

| Master Batch | 37.4 | (0.0374 acid equivalents) |
|---|---|---|
| Polycarbodiimide | 12.6 | (0.0375 carbodiimide equivalents) |

This mix was also stirred well and placed in an oven at 50° C. After 3 days the mix was unchanged (no gelation).

This experiment demonstrated the superiority of aliphatic polycarbodiimides in crosslinking carboxylated resins, especially under the buffered conditions found in most coating operations.

EXAMPLE 4

Polycarbodiimide Synthesis

Into a 500 ml round-bottom flask equipped with heating mantle, mechanical stirrer, thermometer, and nitrogen sparge were charged 22.7 g butyl isocyanate, 127.3 g isophorone diisocyanate, 18 g of a 10% solution by weight of 3-methyl-1-phenyl-2-phospholene-1-oxide in xylene, and 132 g of amyl acetate. The mixture was heated to 145° C. and held for 9 hours at which point the infrared spectrum indicated complete reduction of the isocyanate peak at 2260 $cm^{-1}$ with formation of the carbodiimate peak at 2130 $cm^{-1}$.

The material was cooled and evaluated to have a color rating of 2 on the Gardner Hellige Comparator and a viscosity of less than 0.5 stoke using the Gardner Bubble Viscometer. Titration of the sample gave percent by weight of active carbodiimide functionality of 10.48% (theory 10.20%) using the test of Zaremko and Watts [*Microchem. J. Symp. Ser.*, 2, 591 (1962)]. The theoretical functionality of the product was 6.

EXAMPLE 5

Polycarbodiimide Synthesis

To a one liter round-bottom flask equipped with mechanical stirrer, heating mantle, and thermometer were charged 68.8 g butyl isocyanate, 231.2 g isophorone diisocyanate, 282.0 g amyl acetate, and 18.0 g of a 10% solution by weight of 3-methyl-1-phenyl-2-phospholene-1-oxide. The material was stirred with a slight nitrogen sparge and heated to 145° C. The material was held at 145° C. for approximately 14 hours at which time the infrared spectrum showed complete disappearance of the isocyanate band at 2260 cm$^{-1}$ with appearance of a large carbodiimide band at 2130 cm$^{-1}$.

The material was cooled and evaluated to have a color rating of 4 on the Gardner Hellige Comparator and a viscosity of less than 0.5 stoke using the Gardner Bubble Viscometer. Titration of the sample gave percent by weight of active carbodiimide functionality of 9.34% (theory 10.2%) using the test of Zarembo and Watts.

The theoretical functionality of the product was 4.

EXAMPLE 6

Polycarbodiimide Synthesis

The procedure of Example 5 was repeated with the exceptions that 34.4 g butyl isocyanate, 115.6 g isophorone diisocyanate, 9.0 g of a 10% solution by weight of 3-methyl-1-phenyl-2-phospholene-1-oxide in xylene, and 141 g Butyl CARBITOL Acetate were employed. The resultant material was found to have a color rating of 5 on the Gardner Hellige Comparator and a viscosity of 0.5 stoke using the Gardner Bubble Viscometer. Titration of the sample gave percent by weight active carbodiimide functionality of 9.64% (theory 10.3%) using the test of Zarembo and Watts.

The theoretical functionality of the product was 4. The procedure demonstrated that alternate solvents may be employed.

EXAMPLE 7

Polycarbodiimide Synthesis

Into a 500 ml round-bottom flask equipped with heating mantle, mechanical stirrer, thermometer, and nitrogen sparge were charged 70.7 g butyl isocyanate, 79.3 g isophorone diisocyanate, 18 g of a 10% solution by weight of 3-methyl-1-phenyl-2-phospholene-1-oxide in xylene, and 132 g amyl acetate. The mixture was heated to 145° C. and held for 11 hours at which point the infrared spectrum indicated complete reduction of the isocyanate peak at 2260 cm$^{-1}$ with formation of the carbodiimide peak at 2130 cm$^{-1}$.

The material was cooled and evaluated to have a color rating of 5 on the Gardner Hellige Comparator and a viscosity of less than 0.5 stoke using the Gardner Bubble Viscometer. Titration of the sample gave percent by weight of active carbodiimide functionality of 10.15% (theory 10.63%) using the test of Zarembo and Watts.

The theoretical functionality of the product was 2.

EXAMPLE 8

Roof Coating Formulation

A master batch of materials useful for preparing a roof coating was prepared from the materials listed below:

| | |
|---|---|
| UCAR Latex 153 | 686 g |
| Potassium tripolyphosphate | 3 g |
| Colloid 677 defoamer | 3 g |
| Calidria HPO Asbestos | 12 g |
| Mineralite 3X mica | 140 g |
| TiPure R901 titanium dioxide | 10 g |
| ASP-400 clay | 50 g |
| Chlorowax 40 chlorinated wax | 22 g |
| Antimony oxide | 2 g |
| Tricresyl phosphate | 63 g |
| PMA-30 mildewcide | 2 g |
| Celite 281 diatomaceous silica | 70 g |
| | 1063 g |

The master batch was raised to pH 9 with triethylamine. The aliphatic polycarbodiimide of Example 5 was used to prepare an emulsion as follows:

| | |
|---|---|
| Polycarbodiimide from Example 5 | 40 g |
| Triethylamine | 2 g |
| AEROSOL A-196 | 1 g |
| Water | 157 g |
| | 200 g |

The polycarbodiimide emulsion and the previous master batch were then used to prepare the following formulations:

| Ingredient | 1 | 2 | 3 | 4 |
|---|---|---|---|---|
| Master Batch | 200 | 200 | 200 | 200 |
| Water | 31.4 | 21.0 | 10.5 | — |
| Amyl Acetate | 7.8 | 5.2 | 2.6 | — |
| Polycarbodiimide emulsion | 0 | 26.2 | 52.4 | 78.6 |

These formulations were placed in molds and allowed to air dry for two weeks. Tensile strength measurements were then made on the resultant films:

| Formulation | Tensile Strength, psi | Percent Elongation |
|---|---|---|
| 1 | 49 | 1054 |
| 2 | 170 | 63 |
| 3 | 223 | 30 |
| 4 | 322 | 37 |

The combination of increased tensile strength and decreased elongation showed that crosslinking of the roof-coating formulation had occurred.

The films were additionally placed in water for two days to determine the water resistance of the materials. The increase in length and the weight gain due to water absorption were measured:

| Formulation | Percent Length Increase | Percent Weight Gain |
|---|---|---|
| 1 | 44 | 141 |
| 2 | 6 | 19 |
| 3 | 2 | 7 |
| 4 | 2 | 6 |

These values demonstrated the improved properties due to crosslinking from the aliphatic polycarbodiimide.

Finally, the formulations were brush applied to polyurethane foam and showed practical utility as a protective coating under exterior exposure.

EXAMPLE 9

Hardboard Coating Formulation

A master batch of pigment grind useful for coating a type of wood material termed hardboard was prepared as follows:

| Water | 256.2 g |
|---|---|
| Daniels Disperse-Ayd W-22 Dispersant | 20.4 g |
| Igepal CA-630 surfactant | 6.9 g |
| Foamaster VF defoamer | 5.7 g |
| Nopocide N-96 antimicrobial | 17.1 g |
| Snowflake calcium carbonate | 1109.7 g |
| Surfynol 104 surfactant | 8.4 g |
| TiPure R-950 titanium dioxide | 369.6 g |
| Chrome Chem 895 carbon black | 0.9 g |
| Water | 28.5 g |
| | 1823.4 g |

The pigment grind was then used to prepare the base paint formulation:

| Pigment grind | 1800.0 g |
|---|---|
| UCAR Latex 4580 | 1248.0 g |
| Foamaster VF defoamer | 3.0 g |
| CELLOSOLVE Solvent | 127.0 g |
| Hexyl CELLOSOLVE | 84.0 g |
| Dibutyl phthallate plasticizer | 60.0 g |
| Water | 180.0 g |
| POLYOX WSRN (4% active) | 40.6 g |
| 14% Ammonium Hydroxide | 59.0 g |
| Water | 100.4 g |
| | 3702.0 g |

Next, a polycarbodiimide emulsion was prepared using the polycarbodiimide of example 5:

| | % |
|---|---|
| Water | 33.2 |
| Triethylamine | 1.0 |
| AEROSOL A-196 (5% active) | 20.0 |
| Polycarbodiimide | 45.8 |
| | 100.0 |

Finally, an adjustment emulsion was prepared as shown below:

| | % |
|---|---|
| Water | 54.5 |
| Amyl Acetate | 25.5 |
| AEROSOL A-196 (5% active) | 20.0 |
| | 100.0 |

These mixes were used to prepare the following formulations:

| | Parts | | | | |
|---|---|---|---|---|---|
| Ingredient | A | B | C | D | E |
| Base Paint | 53 | 53 | 53 | 53 | 53 |
| Polycarbodiimide emulsion | — | 3 | 6 | 9 | — |
| Adjustment emulsion | 9 | 6 | 3 | — | 9 |
| Water | 5 | 7 | 9 | 10 | 6 |
| CYMEL 303 | — | — | — | — | 1.2 |

These formulations were brush applied to hardboard as a primer coat and then cured in a forced-air oven to a certain peak board temperature. The coatings were then evaluated by rubbing with a cheesecloth coated with methyl ethyl ketone. The results are shown below:

| | MEK Double Rubs at Temperature | | |
|---|---|---|---|
| Formulation | 200° F. | 250° F. | 300° F. |
| A | 8 | 6 | 8 |
| B | 8 | 12 | 20 |
| C | 16 | 12 | 28 |
| D | 20 | 14 | 28 |
| E | 6 | 8 | 20 |

The results show that the systems formulated with the polycarbodiimide cure or crosslink at significantly lower temperature as compared to the control and as compared to the standard crosslinker CYMEL 303, hexamethoxymethyl melamine.

Finally, to test the stability of the formulations, the systems were placed in a 50° C. oven. The status of the systems is noted below:

| Formulation | Status |
|---|---|
| A | Fluid after 18 days |
| B | Fluid after 18 days |
| C | Grainy after 11 days |
| D | Grainy paste after 7 days |
| E | Loose gel after 18 days |

These results additionally showed that the more active crosslinker, the polycarbodiimide, also gave sufficiently stable formulations.

EXAMPLE 10

Metal Coil Coating Formulation

A pigment grind useful for coating metal flatstock was prepared as follows:

| Water | 232.0 g |
|---|---|
| Ammonium hydroxide | 0.5 g |
| Ethylene glycol | 16.5 g |
| TERGITOL NP-10 Surfactant | 11.0 g |
| TAMOL 731 Dispersant | 36.0 g |
| FOAMASTER VF defoamer | 3.0 g |
| Ti-Pure R-960 titanium dioxide | 1059.5 g |
| | 1358.5 g |

The pigment grind was used to prepare the following base paint formulation:

| Pigment grind | 272.0 g |
|---|---|
| FOAMASTER VF | 2.3 g |
| Water | 36.3 g |
| Butyl CARBITOL | 39.9 g |
| UCAR Latex 4511 | 543.8 g |
| Ammonium hydroxide | 5.6 g |
| Water | 50.0 g |
| | 949.9 g |

Next, a polycarbodiimide emulsion was prepared using the polycarbodiimide of Example 5:

| Polycarbodiimide | 30.0 g |
|---|---|
| Dimethylethanol amine | 1.5 g |
| AEROSOL A-196 (5% active) | 30.0 g |

-continued

| | |
|---|---|
| Water | 88.5 g |
| | 150.0 g |

Finally, an adjustment emulsion was prepared as follows:

| | |
|---|---|
| Water | 158 g |
| AEROSOL A-196 (5% active) | 40 g |
| Dimethylethanolamine | 2 g |
| | 200 g |

These mixes were used to prepare the coating formulations:

| Ingredient | A | B | C | D | E |
|---|---|---|---|---|---|
| Base Paint | 106 g | 106 g | 106 g | 106 g | 106 g |
| Polycarbodiimide emulsion | 0 | 16 | 32 | 48 | 0 |
| Adjustment emulsion | 48 | 32 | 16 | 0 | 48 |
| XAMA-7 | — | — | — | — | 2.6 |

XAMA-7 is a polyfunctional aziridene crosslinker available from Cordova.

The formulations were applied to aluminum panels and cured to peak substrate temperatures shown below in a forced air oven. The coatings were then evaluated for solvent resistance by rubbing with a cheesecloth soaked in methyl ethyl ketone. The results at the different curing temperatures are shown below.

| | MEK Double Rubs at Temperature | |
|---|---|---|
| System | 250° F. | 400° F. |
| A | 4 | 6 |
| B | 6 | 50+ |
| C | 16 | 50+ |
| D | 50+ | 50+ |
| E | 50+ | 50+ |

The test was terminated at attainment of 50 double rubs.

The results showed that crosslinking occurred to a high level at the low baking temperature with both the polycarbodiimide and the aziridine crosslinkers. The coating formulations were stored for two weeks, then applied and cured as previously described.

| Aged | MEK Double Rubs at Temperature | |
|---|---|---|
| System | 250° F. | 400° F. |
| A | 4 | 5 |
| B | 12 | 50+ |
| C | 20 | 50+ |
| D | 50+ | 50+ |
| E | 25 | 50+ |

These results showed that the polycarbodiimide performance remained stable with aging while the aziridine crosslinker decreased in efficiency with time.

EXAMPLE 11

Plastic Substrate Formulation

A pigment grind useful for preparing a coating for plastics was prepared as follows:

| | |
|---|---|
| Water | 208.0 g |
| Ammonium hydroxide | 0.5 g |

-continued

| | |
|---|---|
| Ethylene gylcol | 15.0 g |
| IGEPAL CA-630 Surfactant | 10.0 g |
| TAMOL 731 dispersant | 32.5 g |
| FOAMASTER VF defoamer | 2.5 g |
| Ti-Pure R-610 titanium dioxide | 950.0 g |
| | 1218.5 g |

The pigment grind was utilized to prepare the following base paint formulation:

| | |
|---|---|
| Pigment grind | 244.0 g |
| FOAMASTER VF defoamer | 2.0 g |
| UCAR Latex 4511 | 487.0 g |
| Water | 32.0 g |
| Butyl CARBITOL | 36.0 g |
| Ammonium hydroxide | 5.0 g |
| | 806.0 g |

Next, a polycarbodiimide emulsion was prepared using the polycarbodiimide of Example 5:

| | |
|---|---|
| Water | 88.5 g |
| AEROSOL A-196 (5% active) | 30.0 g |
| Dimethylethanol amine | 1.5 g |
| Polycarbodiimide | 30.0 g |
| | 150.0 g |

Finally, an adjustment emulsion was prepared as follows:

| | |
|---|---|
| Water | 158.0 g |
| AEROSOL A-196 (5%) | 40.0 g |
| Dimethylethanol amine | 2.0 g |
| | 200.0 g |

These mixes were used to prepare the following formulations:

| Ingredient | A | B | C | D |
|---|---|---|---|---|
| Base Paint | 106 g | 106 g | 106 g | 106 g |
| Adjustment emulsion | 48 | 32 | 16 | — |
| Polycarbodiimide emulsion | — | 16 | 32 | 48 g |

These formulations were applied to plaques made of sheet molding compound, a filled, glass fiber reinforced composite based primarily on styrene and unsaturated polyester. The coatings were evaluated after curing by rubbing with a cheesecloth soaked in methyl ethyl ketone.

| | MEK Double Rubs After Coatings Baked for 30 min at | |
|---|---|---|
| System | 212° F. | 302° F. |
| A | 5 | 8 |
| B | 8 | 15 |
| C | 10 | 50+ |
| D | 20 | 50+ |

The results show that the polycarbodiimide gives effective crosslinking at low temperature baking and gives superior results upon high temperature baking.

EXAMPLE 12

Pressure Sensitive Adhesive Formulation

To determine the effects of polycarbodiimide crosslinking on the properties of a pressure sensitive adhesive, a series of experiments were accomplished by formulating a commercial pressure-sensitive adhesive carboxylated latex. To accomplish the formulation, two mixes were prepared. First, the polycarbodiimide was emulsified as follows:

| | |
|---|---|
| Polycarbodiimide from Example 5 | 20 g |
| AEROSOL A-196 | 1 |
| Triethylamine | 1 |
| Water | 78 |
| | 100 g |

Next, an adjustment mix was prepared as shown below:

| | |
|---|---|
| AEROSOL A-196 | 1.0 g |
| Triethylamine | 1.0 |
| Water | 86.9 |
| | 88.9 g |

These mixes were used to prepare the following formulations:

| Ingredient | A | B | C | D | E |
|---|---|---|---|---|---|
| UCAR Latex 175 (pH adjusted to 8 with ammonia) | 100 g | 100 g | 100 g | 100 g | 100 g |
| Polycarbodiimide Emulsion | — | 11.9 | 23.8 | 47.5 | 71.3 |
| Adjustment Mix | 71.3 | 59.4 | 47.5 | 23.8 | — |

These formulations were applied to 2 mil MYLAR film, air-dried for 30 minutes, and then baked 30 minutes at 100° C. A portion of the film was applied to a stainless steel panel, then rolled slowly. The film was then peeled off with a measurement of the force in the 180° direction. Another piece of the film was again rolled onto stainless and a 500 g weight was suspended from it. The time to failure was noted. The results of the investigations on the above formulations are given below:

| Formulation | Peel Strength Pounds per inch | Shear Failure Hours |
|---|---|---|
| A | 4.5 | 0.1 |
| B | 0.7 | 0.4 |
| C | 0.1 | 26.0+ |
| D | 0.01 | 1.02 |
| E | No adhesion | |

The results of the experiment are consistent with increased levels of crosslinking as the peel strength or tackiness of the adhesive decreased while the shear strength rose to a maximum then fell.

EXAMPLE 13

Polycarbodiimide Synthesis

Into a 3 liter 4-neck round-bottom flask equipped with a thermometer, nitrogen sparge, feed tank, mechanical stirrer, and condenser were charged 975 g m-xylene and 630 g trimethylhexamethylene diisocyanate. The system was heated to reflux and catalyzed with 3-methyl-1-phenyl-2-phospholene-1-oxide and stirred for about 15 hours at which point approximately ⅔ of the original free isocyanate was converted into carbodiimide functionality. The solution was cooled, and 169.5 g dimethylethanolamine added. After 90 minutes of reaction, 10 g of ethanol was added to cap residual isocyanate. Dropwise was then added 334 g methyl p-toluene sulfonate over a two hour period. Crystals formed, and an additional 356 g m-xylene were added to assist stirring. The crystals were filtered then washed with hexane and dried in a vacuum oven. The product was a white powder and was found to be water soluble. The theoretical functionality of the product was 2.

EXAMPLE 14

Polycarbodiimide Synthesis

Into the apparatus of Example 1 were charged 96.1 g butyl isocyanate, 203.9 g trimethylhexamethylene diisocyanate, 285 g amyl acetate, and 15 g of 10% solution by weight of 3-methyl-1-phenyl-2-phospholene-1-oxide in xylene. The mixture was heated with stirring at 140° C. for 33 hours, then cooled and packaged. Evaluation of the material gave a color of 5 (Gardner Hellige Comparator) and a viscosity of less than 0.5 stoke. Titration of an aliquot yielded 9.56% active carbodiimide functionality.

EXAMPLE 15

Polycarbodiimide Synthesis

Into the apparatus of example 1 were charged 111.2 g butyl isocyanate, 188.8 g hexamethylene diisocyanate, 270 g amyl acetate, and 30 g of 10% solution by weight of 3-methyl-1-phenyl-2-phospholene-1-oxide in xylene. The mixture was heated to 140° C. with stirring for 24 hours then packaged and cooled. Evaluation of the product gave a color rating of 6 (Gardner-Bubble Viscometer). Titration of a sample of the material gave a percent carbodiimide functionality of 10.50%.

EXAMPLE 16

Polycarbodiimide Synthesis

Into the apparatus of Example 1 were charged 82.3 g butyl isocyanate, 217.7 g bis (isocyanato-cyclohexyl) methane, 270 g amyl acetate, and 30 g of 10% solution by weight of 3-methyl-1-phenyl-2-phospholene-1-oxide in xylene. The mixture was heated with stirring at 140° C. for 31 hours. Evaluation of the cooled and packaged material gave a color of 2 (Gardner Hellige Comparator) D and a viscosity of less than 0.5 stoke. Titration of an aliquot yielded a percent carbodiimide functionality of 9.41%.

EXAMPLE 17

Polycarbodiimide Synthesis

Into the apparatus of Example 1 were charged 94.3 g butyl isocyanate, 105.7 g isophorone diisocyanate, 100.0 g trimethylhexamethylene diisocyanate, 270 g amyl acetate, and 30 g 10% solution by weight of 3-methyl-1-phenyl-2-phospholene-1-oxide. The mixture was heated with stirring at 140° C. for about 26.5 hours, then cooled and packaged. Evaluation of the product gave a color rating of 3 (Gardner-Hellige Comparator) with a viscosity of less than 0.5 stoke (Gardner Bubble Viscometer). Titration of an aliquot gave active carbodiimide functionality of 9.91%.

Although the invention has been described in its preferred forms with a certain amount of particularity, it is understood that the present disclosure of the preferred forms has been made only by way of example and that numerous changes may be made without departing from the spirit and the scope of the invention.

I claim:

1. Method for crosslinking water-borne, carboxyl-containing latex resins or neutralized carboxylated water-soluble organic resins which comprises:
   (a) blending said resins at ambient temperatures with about 0.5 to about 30 parts per 100 parts by weight of said resins of an emulsified or water-soluble polyfunctional polycarbodiimide derived from the reaction of mono-di- and tri-cycloaliphatic or saturated aliphatic isocyanates wherein the cycloaliphatic moieties contain from 5 to about 7 carbons and can be substituted with alkyl having 1 to about 6 carbons, and oxygen and the saturated aliphatic moieties contain from 1 to about 18 carbons wherein the mono- and triisocyanates are optional, and
   (b) allowing volatilization of certain formulated materials resulting in a crosslinked product.

2. Method claimed in claim 1 wherein the molar ratio of monoisocyanate:diisocyanate: is in the range of about 2:1 to about 2:10.

3. Method claimed in claim 1 wherein the monoisocyanate is butyl isocyanate and the diisocyanate is isophorone diisocyanate.

4. Method claimed in claim 1 wherein the diisocyanate is bisisocyanatocyclohexyl methane.

5. Method claimed in claim 1 wherein the reaction of isocyanates is catalyzed.

6. Method claimed in claim 5 wherein the catalyst is 3-methyl-1-phenyl-2-phospholene-1-oxide.

7. Method claimed in claim 1 wherein the synthesis of the polycarbodiimide is carried out in the presence of an inert solvent.

8. Method claimed in claim 7 wherein the solvent is an aromatic hydrocarbon having 6 to about 12 carbons.

9. Method claimed in claim 7 wherein the solvent is an aliphatic ester having about 8 to 20 carbons.

10. Method claimed in claim 7 wherein the solvent is a glycol diester or glycol ether diester having about 8 to 20 carbons.

11. Method claimed in claim 1 wherein the polycarbodiimide contains a quaternary salt moiety and only a diisocyanate is used for the synthesis of the polycarbodiimide.

12. Method claimed in claim 1 wherein carboxyl-containing latex resin contains acrylic or methacrylic acid copolymerized therein.

13. Method claimed in claim 1 wherein the carboxyl-containing latex resin contains maleic or fumaric acid copolymerized therein.

14. Method claimed in claim 1 wherein the carboxyl-containing latex resin contains itaconic acid copolymerized therein.

15. A water-borne, crosslinked polycarboxylic acid resin produced by the method claimed in claim 1.

16. A crosslinkable, water-based and/or methoxy ethyl acetate based composition which crosslinks at ambient temperature allowing volatile formulated components to volatilize and is capable of application and flow on a solid substrate, comprising:
   (A) a crosslinking agent selected from the group consisting of saturated aliphatic or cycloaliphatic carbodiimides, polycarbodiimides and substituted polycarbodiimides;
   (B) a carboxylated organic resin to react with said crosslinking agent; and
   (C) a solvent selected from the group consisting of water and methoxy ethyl acetate.

17. A crosslinkable, water-based and/or methoxy ethyl acetate-based composition which crosslinks at ambient temperature allowing volatile formulated components to volatilize and is capable of application and flow on a solid substrate, comprising:
   (A) a crosslinking agent selected from the group consisting of saturated aliphatic or cycloaliphatic carbodiimides, polycarbodiimides and substituted polycarbodiimides;
   (B) a carboxylated organic resin present in the stoichiometric quantity required to react with said crosslinking agent; and
   (C) a solvent selected from the group consisting of water and methoxy ethyl acetate.

18. A composition according to claim 16 having:
   (A) about 0.7 to 28% by weight of said crosslinking agent;
   (B) about 17.5 to 46% by weight of said carboxylated organic resin; and
   (C) about 39 to 81% by weight of said solvent.

19. A composition according to claim 16 wherein the crosslinking agent is a cycloaliphatic carbodiimide obtained by reacting isophorone diisocyanate and butyl isocyanate, the carboxylated organic resin is an acrylic latex, and the solvent comprises water.

20. A composition according to claim 19 having:
   about 1.7 to 3.8% by weight of said crosslinking agent;
   about 34 to 46% by weight of said acrylic latex; and
   about 52.3 to 62.2% by weight of water.

21. A composition according to claim 19 having a pH of about 9.

22. A composition according to claim 17 wherein the crosslinking agent is a cycloaliphatic carbodiimide obtained by reacting isophorone diisocyanate and butyl isocyanate, the carboxylated organic resin is an alkyd resin obtained by reacting an aromatic anhydride and a polycaprolactone polyol, and the solvent comprises methoxy ethyl acetate.

23. A composition according to claim 22 wherein the aromatic anhydride is phthallic anhydride and the polyol is a triol.

24. A composition according to claim 23 having:
   about 25 to 28% by weight of said crosslinking agent;
   about 26 to 27% by weight of said alkyd resin; and
   about 38 to 40% by weight of methoxy ethyl acetate.

25. A composition according to claim 16 wherein the crosslinking agent is a cycloaliphatic carbodiimide obtained by reacting isophorone diisocyanate and butyl isocyanate, the carboxylated organic resin is a modified styrene acrylic latex, and the solvent comprises water.

26. A composition according to claim 25 having:
   about 1.5 to 4.3% by weight of said crosslinking agent;
   about 17.5 to 18.7% by weight of said modified styrene acrylic latex; and
   about 78.2 to 80.8% by weight of water.

27. A composition according to claim 16 wherein the crosslinking agent is a cycloaliphatic carbodiimide obtained by reacting isophorone diisocyanate and butyl isocyanate, the carboxylated organic resin is a styrene acrylic latex, and the solvent comprises water.

28. A composition according to claim 27 having:

about 1.2 to 3.9% by weight of said crosslinking agent;

about 22% by weight of said styrene acrylic latex; and about 74.1 to 76.8% by weight of water.

29. A composition according to claim 16 wherein the crosslinking agent is a cycloaliphatic carbodiimide obtained by reacting isophorone diisocyanate and butyl isocyanate, the carboxylated organic resin is an acrylic latex, and the solvent is water.

30. A composition according to claim 29 having:

about 0.7 to 4.1% by weight of said crosslinking agent;

about 29% by weight of said acrylic latex; and about 66.9 to 70.3% by weight of water.

31. A composition according to claim 30 having a pH of about 8.

32. A method of producing a crosslinkable, water-based and/or methoxy ethyl acetate based composition which crosslinks at ambient temperature allowing volatile formulated components to volatilize and is capable of application and flow on a solid substrate, said method including the following steps:

mixing and agitating in an essentially fluid state so as to cause dispersion of the mixture;

(i) a crosslinking agent selected from the group consisting of saturated aliphatic or cycloaliphatic carbodiimides, polycarbodiimides, and substituted polycarbodiimides;

(ii) a carboxylated organic resin to react with said crosslinking agent; and (iii) a substantial quantity of water and/or methoxy ethyl acetate;

adjusting the pH so that the composition is alkaline.

33. A method for coating metal substrates wherein said composition of claim 16 is applied thereto.

34. A method for coating solid substrates wherein said composition of claim 16 is applied thereto by brushing.

35. A substrate coated with a coating composition of claim 16.

36. A composition according to claim 16 having:

(A) about 0.5 to 23% by weight of components (A) and (B) of said crosslinking agent;

(B) about 76 to 99.5% by weight of components (A) and (B) of said carboxylated organic resin; and (C) solvent in an amount sufficient to allow application and flow on said solid substrate.

* * * * *